United States Patent
Thomas

(10) Patent No.: US 11,351,933 B2
(45) Date of Patent: Jun. 7, 2022

(54) VEHICLE BANNER ASSEMBLY

(71) Applicant: Janis Thomas, Lafayette, LA (US)

(72) Inventor: Janis Thomas, Lafayette, LA (US)

(*) Notice: Subject to any disclaimer, the term of this patent is extended or adjusted under 35 U.S.C. 154(b) by 0 days.

(21) Appl. No.: 17/065,798

(22) Filed: Oct. 8, 2020

(65) Prior Publication Data

US 2022/0111802 A1 Apr. 14, 2022

(51) Int. Cl.
*B60R 13/00* (2006.01)
*G09F 21/04* (2006.01)

(52) U.S. Cl.
CPC ............ *B60R 13/00* (2013.01); *G09F 21/041* (2020.05); *G09F 21/048* (2013.01)

(58) Field of Classification Search
CPC ....... B60R 13/00; B60R 13/04; G09F 21/041; G09F 21/048
See application file for complete search history.

(56) References Cited

U.S. PATENT DOCUMENTS

| | | | | |
|---|---|---|---|---|
| 1,371,678 A | * | 3/1921 | Gerken | G09F 21/04 40/591 |
| 1,372,508 A | | 3/1921 | Herbener | |
| 1,468,672 A | * | 9/1923 | Patten | G09F 21/04 40/591 |
| 3,161,973 A | * | 12/1964 | Hastings | G09F 21/048 40/591 |
| 3,255,543 A | * | 6/1966 | Plazibat | G09F 21/04 40/591 |
| 3,461,584 A | * | 8/1969 | Wilson | G09F 21/04 40/591 |
| 3,636,912 A | | 1/1972 | Kamp | |
| 3,967,575 A | | 7/1976 | Coutts | |
| 4,014,583 A | * | 3/1977 | Forbes | B60R 13/04 293/128 |
| 4,937,962 A | * | 7/1990 | Hornblad | G09F 7/00 40/604 |
| D313,214 S | | 12/1990 | Phillips | |
| 5,517,941 A | | 5/1996 | Fisher | |
| 6,588,133 B1 | * | 7/2003 | Garrity | G09F 17/00 40/591 |
| 9,165,483 B2 | | 10/2015 | Cobane | |
| 2003/0024195 A1 | * | 2/2003 | Koh | B60R 13/01 52/506.01 |
| 2007/0068445 A1 | | 3/2007 | Priegel | |
| 2009/0139441 A1 | | 6/2009 | Barone | |
| 2013/0019795 A1 | | 1/2013 | Leptien | |
| 2013/0320684 A1 | * | 12/2013 | Darrett | B60R 13/043 293/118 |
| 2015/0001838 A1 | * | 1/2015 | Moroz | B60R 13/04 280/770 |
| 2016/0365015 A1 | * | 12/2016 | Young | G09F 7/18 |

* cited by examiner

*Primary Examiner* — Gary C Hoge

(57) ABSTRACT

A vehicle banner assembly for displaying a banner on a vehicle includes a panel is comprised of a magnetic material to magnetically engage a ferromagnetic door of a vehicle. A pair of engagements is each coupled to the panel. Each of the engagements engages an upper edge of the door of the vehicle to retain the panel at a selected location on the door. A banner is coupled to the panel to facilitate the banner to be displayed on the door of the vehicle.

5 Claims, 4 Drawing Sheets

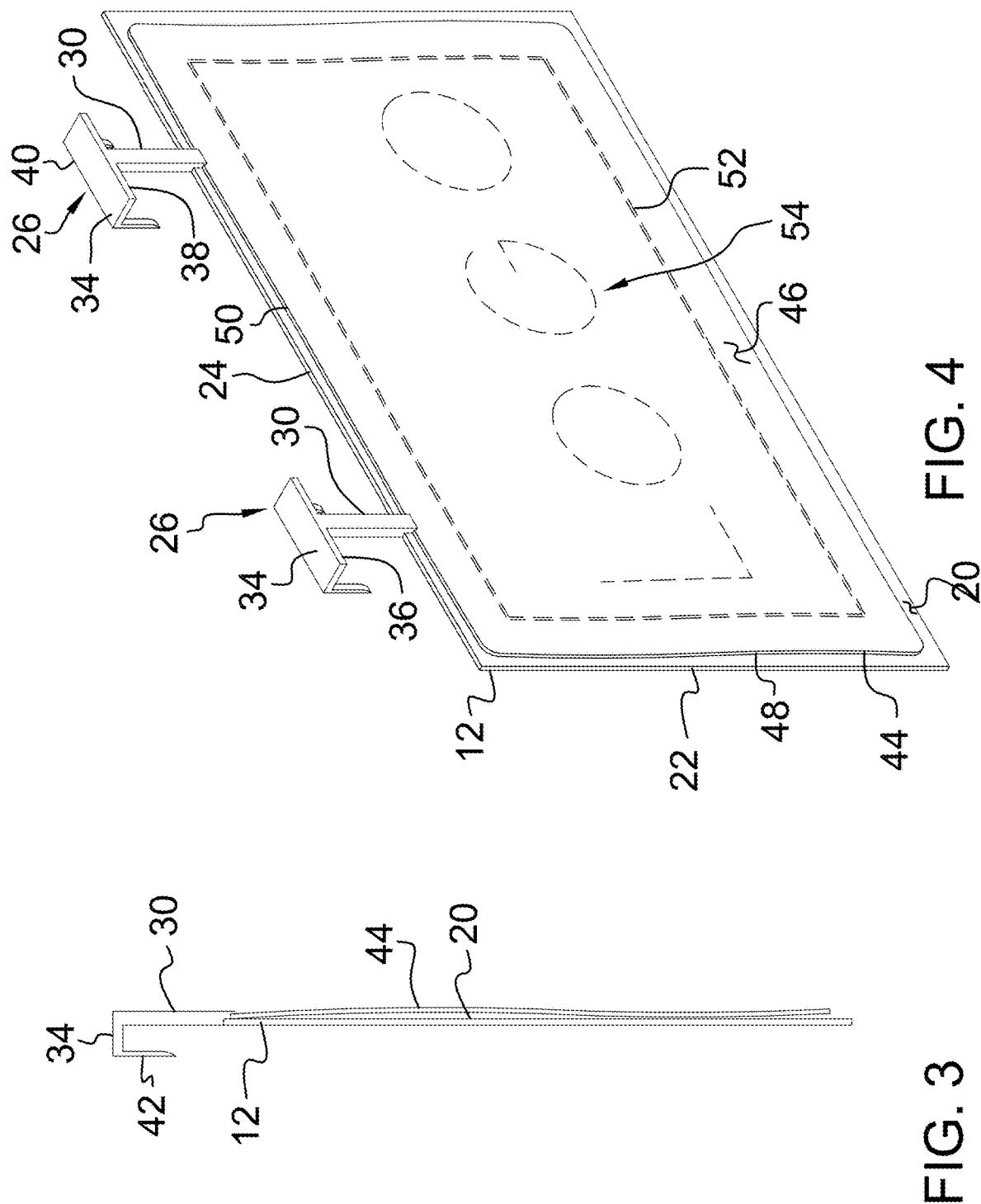

VEHICLE BANNER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to banner devices and more particularly pertains to a new banner device for displaying a banner on a vehicle.

(2) Description of Related Art Including Information Disclosed Under 37 CFR 1.97 and 1.98

The prior art relates to banner devices including a banner that has stitching on an end of the banner to inhibit the banner from whipping. The prior art discloses a variety of banner devices that are attachable to a stanchion on a vehicle. The prior art also discloses a banner that is attachable to a bicycle. The prior art discloses a banner device that includes light emitters for illuminating the banner device. Additionally, the prior art discloses a variety of banners that are constructed in a manner to promote non-furling properties to the banners. The prior art also discloses a banner that can be wrapped around a cylindrical object for the purposes of ornamental display.

BRIEF SUMMARY OF THE INVENTION

An embodiment of the disclosure meets the needs presented above by generally comprising a panel is comprised of a magnetic material to magnetically engage a ferromagnetic door of a vehicle. A pair of engagements is each coupled to the panel. Each of the engagements engages an upper edge of the door of the vehicle to retain the panel at a selected location on the door. A banner is coupled to the panel to facilitate the banner to be displayed on the door of the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is a left side view of an embodiment of the disclosure.

FIG. 4 is a front perspective view of an embodiment of the disclosure.

DETAILED DESCRIPTION OF THE INVENTION

Figure 1:
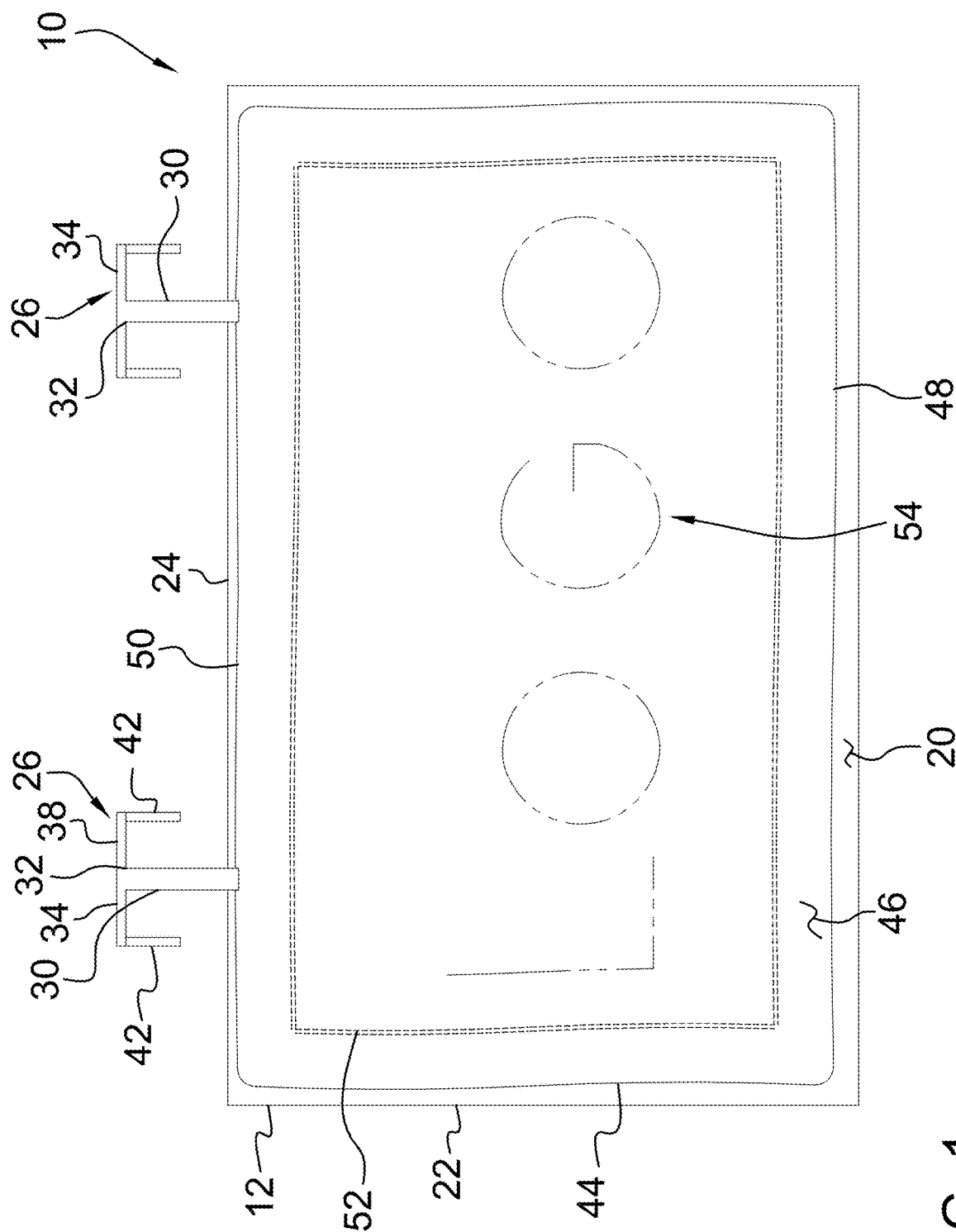
FIG. 1 is a front view of a vehicle banner assembly according to an embodiment of the disclosure.
Figure 2:
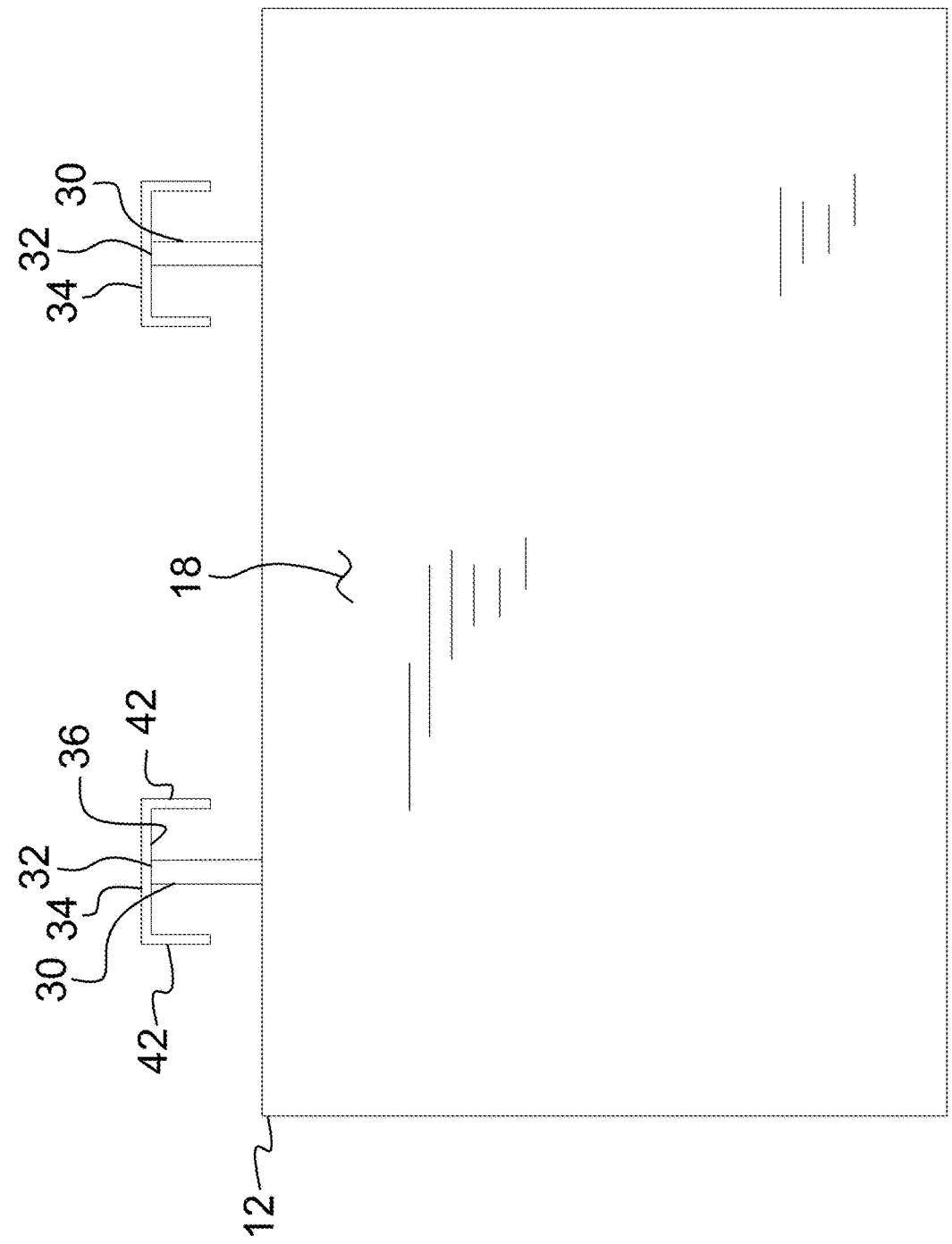
FIG. 2 is a back view of an embodiment of the disclosure.
Figure 5:
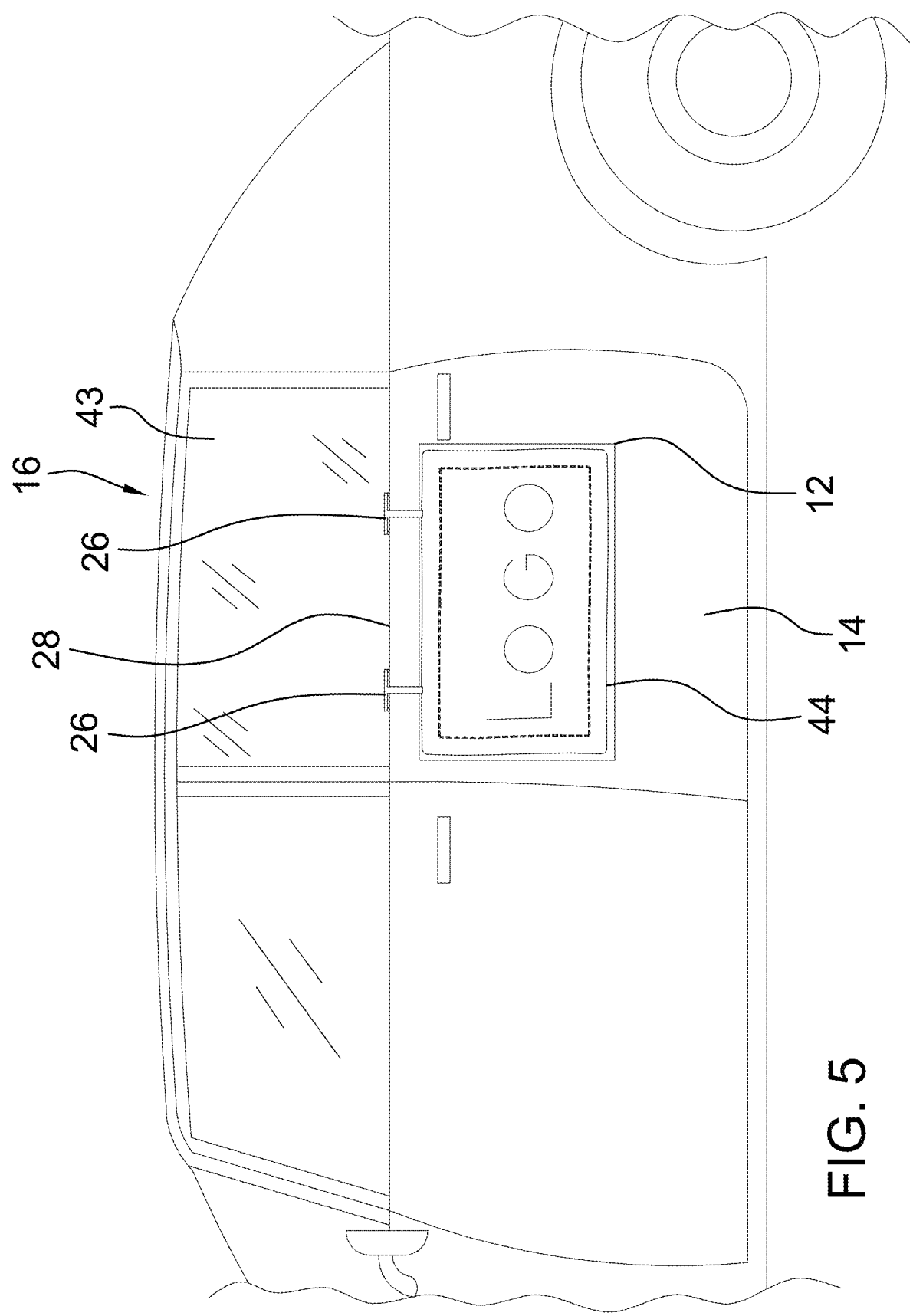
FIG. 5 is a perspective in-use view of an embodiment of the disclosure.

With reference now to the drawings, and in particular to FIGS. 1 through 5 thereof, a new banner device embodying the principles and concepts of an embodiment of the disclosure and generally designated by the reference numeral 10 will be described.

As best illustrated in FIGS. 1 through 5, the vehicle banner assembly 10 generally comprises a panel 12 that is comprised of a magnetic material to magnetically engage a ferromagnetic door 14 of a vehicle 16. The vehicle 16 may be a passenger vehicle, a cargo vehicle or any other type of motorized vehicle that can be driven on public roads. The panel 12 has a back surface 18, a front surface 20 and a perimeter edge 22 extending therebetween, and the perimeter edge 22 has a top side 24. A pair of engagements 26 is each coupled to the panel 12 and each of the engagements 26 engages an upper edge 28 of the door 14 of the vehicle 16. In this way the engagements 26 retain the panel 12 at a selected location on the door 14.

Each of the engagements 26 comprises a stem 30 that is coupled to and extends upwardly from the top side 24 of the perimeter edge 22 of the panel 12, and the stem 30 has a distal end 32 with respect to the top side 24. Each of the engagements 26 includes a plate 34 that has a lower surface 36, a front edge 38 and a back edge 40. The distal end 32 of the stem 30 is coupled to the lower surface 36 such that the plate 34 lies on a horizontal plane. Additionally, the back edge 40 is aligned with the distal end 32 and the stem 30 is centrally positioned on the back edge 40.

A pair of fingers 42 is each coupled to and extends downwardly from the lower surface 36 of the plate 34. Each of the fingers 42 is aligned with the front edge 38 of the plate 34. Additionally, each of the fingers 42 extends downwardly between the door 14 of the vehicle 16 and a window 43 of the vehicle 16. The lower surface 36 of the plate 34 rests on the upper edge 28 of the door 14 when the fingers 42 are extended downwardly between the door 14 and the window.

A banner 44 is coupled to the panel 12 such that the banner 44 is displayed on the door 14 of the vehicle 16. The banner 44 has a forward surface 46 and a peripheral edge 48, and the peripheral edge 48 has a top side 50. The top side 50 of the peripheral edge 48 is coupled to the front surface 20 of the panel 12 at a point located adjacent to the top side 24 of the perimeter edge 22 of the panel 12. The banner 44 is comprised of a flexible material, such as a textile, a synthetic fabric or other similar type of material.

The banner 44 has stitching 52 extending therethrough such that the stitching 52 is visible on the forward surface 46. The stitching 52 is spaced from the peripheral edge 48 and the stitching 52 is coextensive with the peripheral edge 48. Additionally, the forward surface 46 has logo indicia 54 printed thereon to display the logo indicia 54 on the door 14 of the vehicle 16. The logo indicia 54 may be an image associated with a sports team, a logo of a business, a flag representing a nation or any other desired image.

In use, each of the engagements 26 is positioned to engage the upper edge 28 of the door 14 thereby facilitating the panel 12 to magnetically engage an outer surface 56 of the door 14. In this way the banner 44 is mounted on the door 14 for the purposes of display. The panel 12 inhibits the banner 44 from whipping against the door 14 when the vehicle 16 is driven. In this way the door 14 is protected from being marred or otherwise defaced from the whipping action of the banner 44. The panel 12 and the engagements 26 are removable from the door 14 at any time.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle banner assembly for displaying a banner on a door of a vehicle, said assembly comprising:
   a panel being comprised of a magnetic material wherein said panel is configured to magnetically engage a ferromagnetic door of a vehicle, said panel having a back surface, a front surface and a perimeter edge extending therebetween, said perimeter edge having a top side;
   a pair of engagements, each of said engagements being coupled to said panel, each of said engagements engaging an upper edge of the door of the vehicle wherein said engagements are configured to retain said panel at a selected location on the door, each of said engagements including
   a stem being coupled to and extending upwardly from said top side of said perimeter edge of said panel, said stem having a distal end with respect to said top side,
   a plate having a lower surface, a front edge and a back edge, said distal end of said stem being coupled to said lower surface such that said plate lies on a horizontal plane, said back edge being aligned with said distal end, said stem being centrally positioned on said back edge, and
   a pair of fingers, each of said fingers being coupled to and extending downwardly from said lower surface of said plate, each of said fingers being elongated extending away from said plate, said fingers being spaced apart such that each finger extends from a respective end of said plate, each of said fingers being aligned with said front edge of said plate, each of said fingers extending downwardly between the door of the vehicle and a window of the vehicle having said lower surface of said plate resting on the upper edge of the door; and
   a banger being coupled to said panel wherein said banner is configured to be displayed on the door of the vehicle.

2. The assembly according to claim 1, wherein said banner has a forward surface and a peripheral edge, said peripheral edge having a top side, said top side of said peripheral edge being coupled to said front surface of said panel at a point located adjacent to said top side of said perimeter edge of said panel.

3. The assembly according to claim 2, wherein said banner has stitching extending therethrough such that said stitching is visible on said forward surface, said stitching being spaced from said peripheral edge, said stitching being coextensive with said peripheral edge.

4. The assembly according to claim 2, wherein said forward surface has logo indicia being printed thereon wherein said banner is configured to display the logo indicia on the door of the vehicle.

5. A vehicle banner assembly for displaying a banner on a door of a vehicle, said assembly comprising:
   a panel being comprised of a magnetic material wherein said panel is configured to magnetically engage a ferromagnetic door of a vehicle, said panel having a back surface, a front surface and a perimeter edge extending therebetween, said perimeter edge having a top side;
   a pair of engagements, each of said engagements being coupled to said panel, each of said engagements engaging an upper edge of the door of the vehicle Wherein said engagements are configured to retain said panel at a selected location on the door, each of said engagements comprising:
   a stem being coupled to and extending upwardly from said top side of said perimeter edge of said panel, said stem having a distal end with respect to said top side;
   a plate having a lower surface, a front edge and a back edge, said distal end of said stem being coupled to said lower surface such that said plate lies on a horizontal plane, said back edge being aligned with said distal end, said stem being centrally positioned on said back edge; and
   a pair of fingers, each of said fingers being coupled to and extending downwardly from said lower surface of said plate, each of said lingers being elongated extending away from said plate, said fingers being spaced apart such that each finger extends from a respective end of said plate, each of said fingers being aligned with said front edge of said plate, each of said fingers extending downwardly between the door of the vehicle and a window of the vehicle having said lower surface of said plate resting on the upper edge of the door; and a banner being coupled to said panel wherein said banner is configured to be displayed on the door of the vehicle, said banner having a forward surface and a peripheral edge, said peripheral edge having a top side, said top side of said peripheral edge being coupled to said front surface of said panel at a point located adjacent to said top side of said perimeter edge of said panel, said banner having stitching extending therethrough such that said stitching is visible on said forward surface, said stitching being spaced from said peripheral edge, said stitching being coextensive with said peripheral edge, said forward surface having logo indicia being printed thereon wherein said banner is configured to display the logo indicia on the door of the vehicle.

* * * * *